Patented Mar. 2, 1937

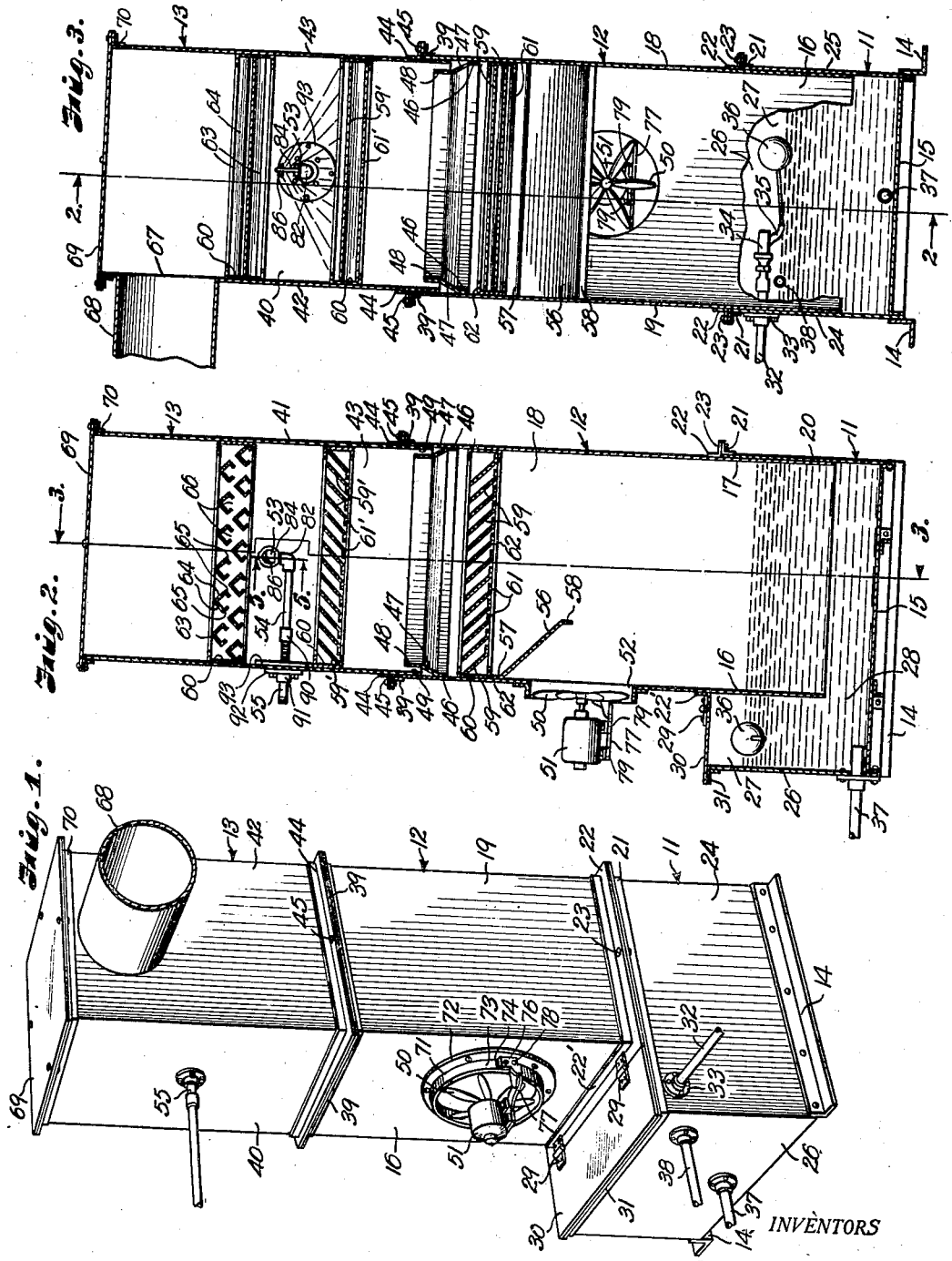

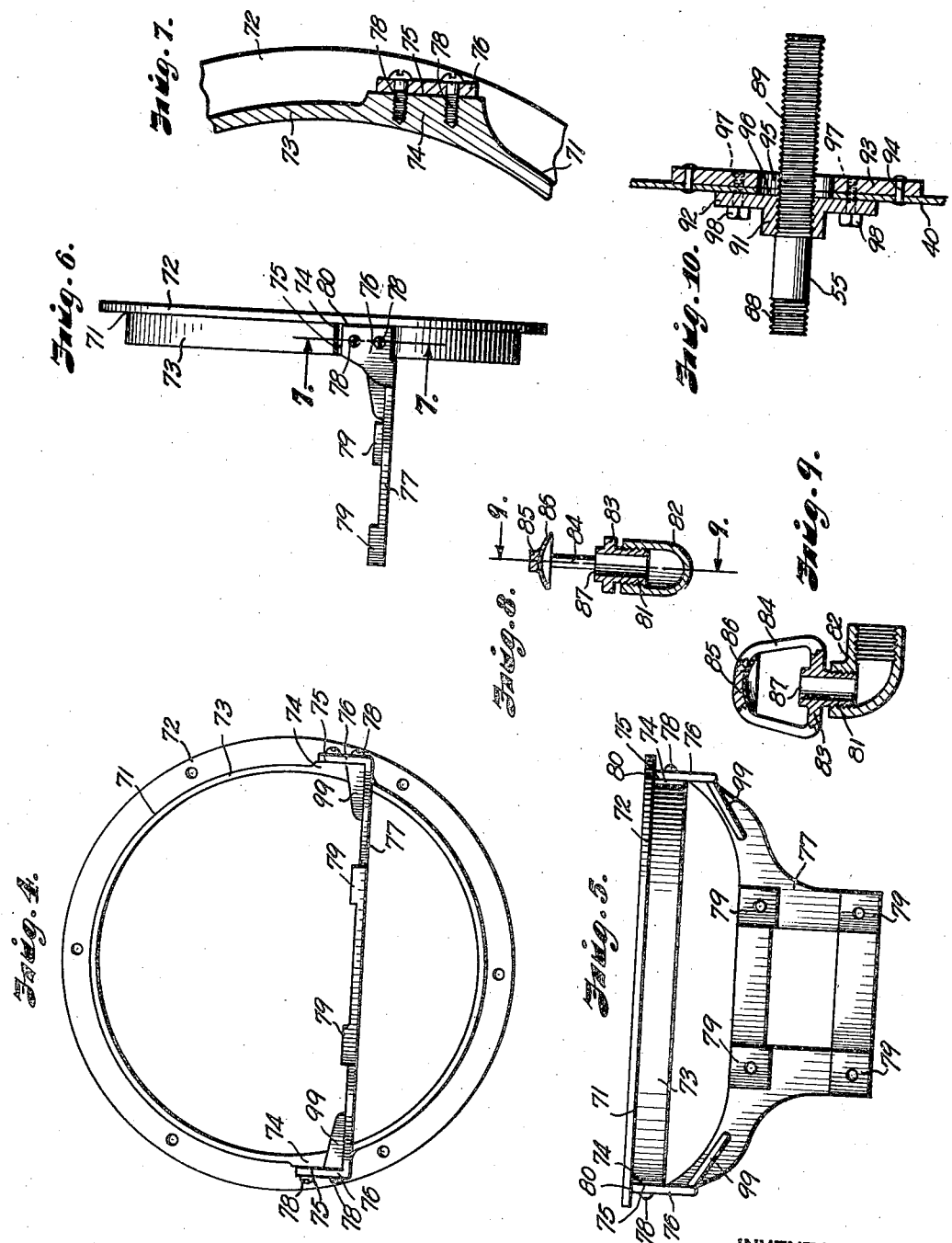

2,072,096

UNITED STATES PATENT OFFICE 2,072,096

COOLING TOWER

Daniel J. Collins and Kenneth V. Wright, Kansas City, Kans., assignors, by direct and mesne assignments, to The Bahnson Company, Winston-Salem, N. C., a corporation of North Carolina Application October 19, 1932, Serial No. 638,592

15 Claims. (Cl. 261—111)

Our invention relates to cooling towers, and more particularly to a tower for cooling water that has been used for refrigerant condensing purposes in a refrigerating system, or for cooling water that has been used to cool any other apparatus.

It is a purpose of our invention to provide a device of the above mentioned character with means for creating a spray of water in a downward direction, and a current of air traveling in the opposite direction in a zig-zag path to create eddies, so that the air will come in contact with the water broken up into drops by the spraying means to cool the same, and to further provide means for abstracting any moisture from the air that passes through the device so that the loss of water, due to the passing of moisture out of the discharge means of the device, will be reduced to a minimum.

It is a further purpose of our invention to provide a device of the above mentioned character, which is so constructed that any of the parts thereof that might require attention can be readily reached for servicing without dismantling the cooling tower. The only apparatus that could possibly require any attention in our cooling means is the spraying means, the means for creating a draft of air and the float valve for maintaining a predetermined level of liquid in a reservoir in the lower portion of the tower.

It is accordingly a purpose of our invention to provide new and improved means for mounting the spraying apparatus comprising a spray head, in such a manner that the spray head and the piping connected therewith inside the tower can be removed therefrom as a unit, and to provide a float chamber that has means providing a water seal between the same and the main portion of the reservoir, and to provide a door for said float chamber so that access can be had to the float and float valve through the door without in any way affecting the circulation of air through the tower. It is also a purpose of our invention to provide a fan motor mounting such that the fan and motor can be readily placed in position relative to an opening in the tower to force a current of air through the opening into the tower, and can also be readily removed without dismantling the tower so that any adjustment or repairs can be made thereto that may be necessary.

It is a further purpose of our invention to provide a vertically elongated cooling tower made up of a plurality of sections, and to provide means for securing the sections together, and means for sealing the joint between the sections, said means comprising a liquid or water seal, which makes it unnecessary to use any gaskets or other sealing means between the telescoping sections of the tower.

It is a particular purpose of our invention to provide means for creating eddies of air in the tower, comprising a deflector mounted above the fan inside the tower to throw the air downwardly and laterally so that the stream of air will engage the opposite wall of the tower and the water at the bottom thereof and will be deflected laterally and upwardly to create a whirl or eddy of said stream of air in the lower portion of the tower. Means is also provided to create further cross-currents or eddies of air above this deflector.

It is another purpose of our invention to provide means for creating such further eddies or cross-currents of air in the upper portion of the tower below the spraying means, which also keep the water, broken up by the spraying means, in drops and bring the air and water into close contact, this being accomplished in addition to the deflection of the air toward one side of the tower to create a further eddy. Said means preferably comprise inclined partition members or plates arranged in close formation to form louvers in the tower, and these are preferably inclined in opposite directions to obtain the proper air eddies in the tower. The eddies are particularly desirable to obtain a thorough mixing of the air and water to cause close contact between the same, and to break the water up in as fine a spray as possible, thus providing a very efficient cooling means for the water.

It is another purpose of our invention to provide means for eliminating the moisture from the air that passes above the spraying means toward the outlet for the air from the tower, as it is undesirable to lose any substantial quantity of the water which is being circulated through the tower. While, of course, all the moisture cannot be eliminated from the air, the major portion thereof can be eliminated and eventually will reach the reservoir from which it is drawn to be used in connection with the refrigerating apparatus, or other means with which the water cooling means is associated. Said eliminator preferably comprises a plurality of inverted V-shaped members arranged in a plurality of rows with the members in adjoining rows arranged in staggered relation, said inverted V-shaped members collectively forming a baffle, and being provided with depending inclined rib portions from which the moisture is adapted to drip off into the portion of the tower in which the eddies are created.

Other objects and advantages of our invention will appear as the description of the drawings proceeds. We desire to have it understood, however, that we do not intend to limit ourselves to the particular details of structure shown or described, except as defined in the claims.

In the drawings:

Fig. 1 is a perspective view of our improved cooling tower.

Fig. 2 is a vertical sectional view thereof, certain parts being in elevation, the section being taken substantially on the line 2—2 of Fig. 3.

Fig. 3 is a vertical sectional view through the tower, taken at right angles to Fig. 2, being taken substantially on the line 3—3 of Fig. 2.

Fig. 4 is a face view of the fan motor mounting bracket used in conjunction with our improved apparatus.

Fig. 5 is a plan view of said bracket.

Fig. 6 is a side elevation thereof.

Fig. 7 is a section taken on the line 7—7 of Fig. 6, partly broken away.

Fig. 8 is a vertical sectional view on an enlarged scale, of the spray head used in conjunction with our improved apparatus.

Fig. 9 is a section taken on the line 9—9 of Fig. 8, and

Fig. 10 is a fragmentary sectional view on an enlarged scale through the mounting for the spray head on the side wall of the tower.

Referring in detail to the drawings, our improved cooling tower comprises a bottom section or reservoir section 11, a central section 12, and a top section 13, all of said sections being made of sheet metal. The bottom section 11 may be provided with angles 14 provided thereon for the purpose of mounting the same to any desired support. It will be noted that the bottom section 11, forming the reservoir portion of our improved cooling tower, is somewhat larger in horizontal dimensions than the sections 12 and 13, and that the angle members 14 are so secured to the vertical walls of the member 11 that the same project downwardly below the bottom 15 of the reservoir to space it from any support upon which the same may be mounted. The section 12 is made of such a size that it will telescope within the section 11, that is, the vertical walls thereof extend downwardly a substantial distance into the reservoir 11 and below the normal level of the water maintained therein. The vertical walls of the section 12 are indicated by the numerals 16, 17, 18 and 19, and it will be seen that the walls 16, 17, 18 and 19 all extend downwardly to within a short distance of the bottom 15.

The vertical wall 20 of the reservoir section 11 has an angle 21 thereon, and the wall 17 of the section 12 has an angle 22 thereon, which are secured together in any suitable manner, as by the fastening elements 23, which are preferably bolts. The wall 24 of the member 11 and the wall 19 of the member 12 are secured together in a similar manner, as are also the wall 25 of the member 11 and the wall 18 of the member 12. The reservoir section 11 extends forwardly beyond the section 12 mounted thereon, and the forward vertical wall 26 thereof is spaced a substantial distance from the vertical wall 16 of the section 12, thus providing a float chamber 27 between the walls 24, 25, 26 and 16, which is in constant communication with the main portion of the reservoir through the passage 28 under the bottom edge of the wall 16.

An angle member 22' similar to the angle member 22, is secured to the wall 16 and extends forwardly therefrom and has the hinges 29 secured thereto, which carry the cover member 30 for the float chamber 27, said cover member overlapping a flange 31 provided along the top edge of the wall 26. It is not necessary to provide any seal between the cover member 30 and the top faces of the angles 21 and 31, as there is a water seal between the float chamber 27 and the interior of the reservoir 11 above the water therein.

Means is provided for replenishing the supply of water in the reservoir 11 when this is necessary, comprising a water inlet pipe 32, which has a flange 33 thereon secured to the outer face of the vertical wall 24, and which carries a float valve 34 provided with an operating lever 35, the position of which is controlled by means of the float 36, the valve opening when the liquid reaches a predetermined low point in a well known manner, and closing when the liquid level reaches a predetermined high point, in a well known manner, the float 36 controlling the valve 34 in such a manner that the liquid level never reaches a minimum that is below the bottom edge of the vertical wall 16, a liquid seal being thus always maintained between the float chamber 27 and the main portion of the reservoir 11. The float chamber 27 is provided with an outlet pipe 37, which is connected with a pump or other means for withdrawing the water from the reservoir to circulate the same, and is also provided with an overflow pipe 38, which will prevent any overflow of the reservoir, due to failure of the float valve to operate to shut off the supply of water from the pipe 32, should the float valve get accidentally stuck.

Due to the telescopic arrangement of the sections 11 and 12 and the fact that the lower edges of all the vertical walls of the section 12 extend into the liquid in the reservoir 11, no packing is needed for the joint between the sections 11 and 12. A similar joint is provided between the sections 12 and 13 so that no packing is necessary between the same, the section 13 being slipped into the section 12 in a similar manner to that in which the section 12 is slipped into the section 11. Thus, each of the walls 16, 17, 18 and 19 is provided with an angle member 39 adjacent the top edge thereof, and each of the vertical walls 40, 41, 42 and 43 of the top section 13 is provided with an angle member 44 spaced from the bottom edge thereof engaging the angle member 39, said angle members 39 and 44 being connected together by suitable fastening elements 45, which are preferably bolts. Each of the walls 16, 17, 18 and 19 of the lower section 12 are provided with a trough forming member, which has a vertically extending bottom flange 46, an inwardly inclined portion 47 and an upper vertically extending wall portion 48 spaced from the vertical wall of the section 12 to which each of the trough forming members is secured, the portion 48 of each of said trough forming members being spaced from the depending portions of the vertical walls of the section 13, thus providing a continuous channel around the member 12 adjacent the top thereof within which the bottom edge 49 of each of the vertical walls of the section 13 is located. This trough or channel is made water-tight so that liquid will collect therein, the trough forming means being either continuous or secured together at any joints that may be provided therein, in liquid-tight relation, and the flanges 46 thereon being soldered or otherwise secured in liquid-tight relation with the vertical walls with which the same are connected. Thus a liquid-tight seal is provided between the sections 12 and 13 at the joint between the same, and it is unnecessary to provide any form of packing between the sections, the same being merely slipped into each other and bolted together at the flanges 39 and 44.

Means is provided for introducing a stream of air into the section 12 of the tower, said means comprising a fan 50 provided with a motor 51, and an opening 52 is provided in the wall 16 aligning with the fan 50 so that air is blown in through the opening 52 into the space within the section 12. The section 13 is provided with means for spraying the water that is to be cooled by the cooling tower into the same in a downward direction, said means comprising a spray head 53, which is mounted on a suitable water pipe 54, which is connected with a circulating water supply pipe 55. Between the spray head 53 and the reservoir 11, suitable means is provided for creating eddies in the air passing generally upwardly in the tower and for keeping the water divided up into a drop-like form to cause close contact between the water and the air so that the heat will be absorbed from the water by the air in the passage of the water and air through the tower in opposite directions. Said means comprises a deflector member 56, which has a flange 57 secured to the wall 16, and a depending lip 58 at the lower end thereof, said deflector 56 being inclined inwardly and downwardly from the wall 16 at a point above the opening 52 so as to be spaced from the wall 16 at the opening 52, the stream of air from the fan 50 striking the inclined portion 56 and the lip 58, causing a lateral and downward deflection of the current created by the fan to thus create a whirl or eddy in the bottom of the section 12, which will strike the surface of the liquid in the reservoir 11, causing an upward deflection of the air current toward the upper portion of the section 12, the tendency being for most of the air to strike the wall 17 opposite the wall 16, either after striking the surface of the liquid or without striking the surface of the liquid, at an oblique angle, so as to be thrown again toward the central portion of the section 12.

In order to create a further eddy of the air in the tower, deflecting means is provided, above the deflector 56, made in the form of louvers, comprising obliquely extending sheet metal members 59, which form inclined deflector plates or partitions that are closely spaced, the same being mounted in fixed position in a frame made up of a channel member 60, arranged in a rectangular form to fit within the section 12 so as to be secured face to face to the vertical walls 16, 17, 18 and 19 by soldering or in any other manner.

The inclined fins or deflector plates 59 are provided with substantially horizontally extending flanges 61 at the bottoms thereof that are secured to the bottom flange 62 of the channeled frame 60, these being spaced to provide slits between the adjoining members 59 at their lower edges, through which the upwardly passing current of air may flow. These deflector members 59 thus will throw the upwardly passing stream of air laterally toward the wall 16, and the stream striking the wall 16 and the wall 40 at an oblique angle will cause a further eddy in the tower above the deflector made up of the members 59. The members 59 with the bottom flanges 61 thereon also serve as means for distributing the water from the spray head 53, or in other words, keep the same broken up in drops so that a more intimate contact will be made between the air and the water, the flanges 61 serving to break up any water, that strikes the same, into drops, as well as serving at the ends thereof as means for fastening the diagonally extending members 59 to the frame 60.

Spaced a substantial distance vertically from the water distributing air deflector member described above, is a similar deflector member having the louvers or inclined deflector plates 59' having the flanges 61' thereon, these being mounted in a frame 60 just as are the members 59, but being inclined in the opposite direction to 59, thus throw the upwardly passing current of air toward the wall 41, causing the same to strike the wall 41 at an oblique angle, and providing a further eddy in the air passing upwardly in the tower, the members 59' and the flanges 61' thereon operating in the same manner as the members 59 and flanges 61 of the lower distributing member previously described.

Due to the manner in which the water and air are brought into intimate contact, the air passing above the spray head 53 will be moisture-laden, and in order to prevent the loss of a large amount of water by discharge of moisture-laden air from the tower, suitable moisture eliminating means is provided. The moisture eliminating means comprises a channel frame 60, similar to the frame 60 previously described and mounted in the tower by connection with the walls 41, 42 and 43 in a similar manner to that in which the frames 60 of the two distributor members are secured to the vertical walls of the tower. The moisture eliminating means comprises a plurality of elongated horizontally extending members 63, which extend from one side of the frame 60 to the opposite side thereof between the walls 42 and 43, and are each provided with a pair of downwardly diverging walls 64, thus providing substantially an inverted V-shaped body portion for each of the members 63, and each downwardly inclined wall 64 is provided with an inclined lip portion 65, said lip portions converging, but being spaced from each other to provide a slotted opening 66 in the bottom of each of the members 63. The members 63 are arranged in two horizontal rows, the members slightly overlapping each other in a vertical direction and being arranged in staggered relation so that the lip portions 65 of the upper members 63 slightly overlap the apexes of the lower members 63. Thus a plurality of inclined baffle walls are formed by the members 63, and within each member 63 a pocket is formed that has inclined wall portions within which the moisture-laden air is trapped, the moisture condensing on the inclined walls 64 and 65 and dripping off the bottom edges of the lips 65. The moisture also will drip off the outer walls of the members 63 as the same passes in a circuitous path between the members 63, the lower set of members 63 tending to direct the air into the pockets in the upper members 63, and the air passing outwardly between the members 63, and into the space above the same toward the air outlet opening, will have contacted with a plurality of the walls of the members 63 and substantially all of the moisture will have collected on the members 63 and have dropped off the same so that only a minimum of moisture will be lost due to passing out of the tower through the outlet conduit 68, which is shown as being provided in the wall 42. The top of the tower is closed by a cover member 69, which is secured thereto by bolting to an angular member 70 secured to the top edges of the walls 40, 41, 42 and 43.

The fan motor 51 is mounted on a bracket comprising a circular or ring-like member 71, which has a flange 72 that is bolted to the wall 16. The ring-like member 71 also has a flange 73 thereon, which is provided with a thickened portion 74 on opposite sides thereof slightly below the center of the ring, and each of the thickened portions has a flat vertical outer face 75, with which an ear 76 of a bracket member 77 is connected by any suitable fastening means, such as the headed screw-threaded members 78. The bracket member 77 is provided with a plurality of thickened portions 79 thereon for bolting the motor 51 thereto, and has the diagonally extending upstanding reinforcing flanges 99 thereon adjacent the ears 76. Thus the motor is mounted in a readily accessible position, and if it is necessary to remove the motor and fan for repairs or inspection, all that is necessary is to remove the fastening elements 78 and thus remove the brackets 76 from the ring-like member 71. The forward vertical edge 80 of the bracket member 76 engages with the flange 72 to brace the same and reduce the strain on the fastening elements 78. Thus a simple one-piece mounting for the fan motor is provided, whereby the fan can be readily placed in position and removed from the tower.

The spray head 53 is made so as to provide a cone-like downwardly directed spray of water in the tower, and comprises a tubular member or nipple 81, which is provided with suitable threads thereon to be connected with the elbow 82, which is mounted on the pipe 54. The nipple 81 is provided with a flange 83 having a pair of upwardly and inwardly directed arms 84 thereon, which connect with a central block 85, to which a concavo-convex sheet metal deflector plate 86 is connected in any suitable manner, as by soldering. The concave face of the member 86 is directed toward the outlet end 87 of the nipple 81, and aligns axially therewith so that the stream of water passing from the outlet 87 will strike substantially centrally of the concave face of the member 86, and will thus be directed downwardly and laterally to create a cone-like spray, which substantially divides the water up into a droplike form.

Means is provided for mounting the spray head 53 in such a manner that it can be removed along with the pipe connection 54 as a unit from the interior of the tower, said means comprising the nipple 55 having the thread 88 thereon for connection with any suitable pipe leading from the apparatus that the water has cooled, and with a long threaded portion 89 thereon, which has the coupling 90 connected therewith to connect the nipple 55 with the pipe 54. The thread 89 also screw-threadedly receives a pipe flange 91, which has the lateral flange portion 92 thereof provided with a plurality of bolt holes therein.

A ring-like member 93 is permanently secured to the inner face of the vertical wall 40 in any suitable manner, as by means of rivets 94, said ring-like member 93 serving as a reinforcement to the sheet metal wall 40 and having a large opening 95 therein of substantially the same size as the corresponding opening 96 in the sheet metal wall 40, said opening being of smaller diameter than the flange 92, and the ring-like member 93 being of considerably greater diameter than the flange 92, said ring-like member 93 having screw-threaded openings 97 therein for receiving the bolts 98 that secure the flange 92 to the ring-like member 93, thus securing the nipple 55 and thereby the pipe 54 and the spray head 53 in fixed position in the tower.

In case it is desired to remove the spray head for any purpose, all that is necessary is to unscrew the bolts 98 and unscrew the nipple 55 from the pipe with which it connects exteriorly of the tower, whereupon the pipe 54, the nipple 55 and the spray head 53 can be withdrawn as a unit from the tower, the spray head 53 passing through the opening 95 and the opening 96 readily, with only a slight tilt of the nipple 55 and pipe 54 being necessary. Thus the spray head can be reached without dismantling the tower, as can also all other moving parts of the device.

What we claim is:—

1. In a cooling tower of the character described, said tower having an air inlet opening spaced from the bottom thereof, a downwardly inclined deflector adjacent said opening, two sets of vertically spaced inclined louvers above said deflector, a spray head, directing a spray downwardly toward said louvers mounted in the upper portion of said tower above said louvers and a plurality of moisture extractor members mounted above said spray head comprising inverted V-shaped members having inclined lips thereon, said tower having an air outlet adjacent the top thereof.

2. In a cooling tower, a vertically elongated eddy chamber in the bottom thereof, said chamber having a water reservoir at the bottom thereof having means for determining the level of the water therein, an air inlet opening in the side thereof near the top of said chamber, means for forcing a stream of air through said opening into said chamber, deflecting means in said chamber above said opening inclined to direct said stream of air downwardly at an oblique angle, said air inlet opening being spaced a substantial distance above the surface of the water, a plurality of closely spaced deflector members in said tower above said first mentioned deflector upwardly inclined toward the wall having said opening and located in spaced relation upwardly from said opening, a plurality of closely spaced deflector members above said last mentioned deflector member upwardly inclined toward the opposite wall of said tower, and means for spraying water downwardly from above said uppermost deflectors.

3. In a cooling tower, a vertically elongated eddy chamber in the bottom thereof, said chamber having a water reservoir at the bottom thereof having means for determining the level of the water therein, an air inlet opening in the side thereof near the top of said chamber, means for forcing a stream of air through said opening into said chamber, deflecting means in said chamber above said opening inclined to direct said stream of air downwardly at an oblique angle, said air inlet opening being spaced a substantial distance above the surface of the water for deflecting said stream of air downwardly and laterally toward a wall of said tower, means in the top of said tower for spraying water downwardly thereon, and vertically spaced means in said tower between said water spraying means and said means for forcing air into said tower for deflecting upwardly flowing air first laterally toward one side of said tower and then laterally toward the opposite side of said tower.

4. In a sheet metal cooling tower, an angular spray head mounted wholly within said tower, a water pipe leading to said spray head, said tower having an opening in the side wall thereof through which said head is adapted to be passed, said pipe extending exteriorly of said tower, a flange on said pipe exteriorly of said tower, a reinforcing ring fixed on the inner face of said side wall having an opening therein through which said spray head may be passed, said pipe extending beyond said flange and ring both internally and externally of said tower, and means detachably connecting said flange and said ring, whereby said spray head and pipe are removable from said tower as a unit.

5. In a cooling tower, a pair of vertically elongated sections vertically adjoining, said sections having vertically extending walls, means connecting said sections together with said vertically extending walls in substantial alignment, and means providing a fluid-tight joint between said sections comprising a liquid seal for said joint on the inner faces of said vertical walls.

6. In a cooling tower, a pair of vertically elongated telescoping sections, said sections having vertically extending walls, means for securing said sections in fixed vertically adjoining relation to each other with said vertically extending walls substantially in face to face engagement, liquid spraying means in said tower, and means for sealing the joint between said sections comprising a liquid receiving trough formed on the inner faces of the vertical walls of the lower of said sections and overlapping the lower edges of the vertical walls of the upper of said sections.

7. In a cooling tower, liquid spraying means, a liquid reservoir receiving said sprayed liquid, means independent of said spraying means for supplying liquid thereto, means for controlling the supply of liquid to said reservoir comprising a float chamber in communication with said reservoir, a float in said chamber, and a float actuated valve, and means for forcing air into said tower, said float chamber being provided with means for preventing air from passing from said tower into said float chamber.

8. In a cooling tower, liquid spraying means, a liquid reservoir receiving said sprayed liquid, means independent of said spraying means for supplying liquid thereto, means for controlling the supply of liquid to said reservoir comprising a float chamber in communication with said reservoir, a float in said chamber, and a float actuated valve, said spraying means operating independent of said controlling means, and means for forcing air into said tower, said float chamber being provided with means for preventing air from passing from said tower into said float chamber, comprising a partition between said float chamber and said reservoir extending downwardly from the top of said float chamber and terminating below the lowest liquid level maintained in said reservoir.

9. In a cooling tower, liquid spraying means, a liquid reservoir receiving said sprayed liquid, means independent of said spraying means for supplying liquid to said reservoir, means for controlling the supply of liquid to said reservoir comprising a float chamber in communication with said reservoir, a float in said float chamber and a float actuated valve, means for forcing air into said tower, said float chamber being provided with means for preventing air from passing from said tower into said float chamber, and a door leading into said float chamber to provide access to said float.

10. In a sheet metal cooling tower having an opening in a side wall thereof, an angular spray head and a pipe leading to said spray head and extending from said head continuously outwardly through said opening, and means externally of said tower for detachably connecting said pipe to said wall at said opening, said pipe and said spray head being removable from said tower through said opening as a unit from the outside thereof.

11. In a sheet metal cooling tower, an angular spray head located entirely within said tower, and a pipe leading uninterruptedly to said spray head from externally of said tower, and means for mounting said pipe and head in said tower to permit removal thereof through an opening in a side wall of said tower as a unit, said opening being much larger than said pipe to permit such removal, and said means normally closing said opening.

12. In a humidifier, means for breaking up water into particles which may be entrained in and evaporated by an air current, a casing enclosing said means, and providing passages for entrant air and for effluent moisture-laden air, said casing comprising a plurality of separable members, and sealing means between adjacent separable members, said sealing means comprising cups adapted to retain and to return to the interior of said casing water draining into them from the casing walls upon which moisture is deposited by the effluent air.

13. In a humidifier, means for breaking up water into particles which may be entrained in and evaporated by an air current, a casing enclosing said means and providing passages for entrant air and for effluent moisture-laden air, said casing including two separable members, and sealing means between said members including a cup on one of said members and a lip on the other member and extending into said cup, said cup adapted to retain and to return to the interior of said casing water draining into it from the casing walls upon which moisture is deposited by the effluent air.

14. In a device of the character described, means for breaking up water into particles which may be entrained in and evaporated by an air current, a casing enclosing said means, and providing passages for entrant air and for effluent moisture-laden air, said casing comprising a plurality of separable members, and sealing means between adjacent separable members, said sealing means comprising cups adapted to retain and to return to the interior of said casing water draining into them from the casing walls upon which moisture is deposited by the effluent air.

15. In a device of the character described, means for breaking up water into particles which may be entrained in and evaporated by an air current, a casing enclosing said means and providing passages for entrant air and for effluent moisture-laden air, said casing including two separable members, and sealing means between said members including a cup on one of said members and a lip on the other member and extending into said cup, said cup adapted to retain and to return to the interior of said casing water draining into it from the casing walls upon which moisture is deposited by the effluent air.

DANIEL J. COLLINS.
KENNETH V. WRIGHT.